United States Patent [19]

Welkowsky

[11] Patent Number: 4,894,724
[45] Date of Patent: Jan. 16, 1990

[54] SYSTEM AND METHOD FOR PRODUCING A FLICKER-FREE VIDEO IMAGE

[75] Inventor: Murray S. Welkowsky, Chatsworth, Calif.

[73] Assignee: Hughes Aircraft Company, Los Angeles, Calif.

[21] Appl. No.: 137,543

[22] Filed: Dec. 23, 1987

[51] Int. Cl.⁴ ............................................... H04N 5/33
[52] U.S. Cl. ..................................... 358/231; 358/232; 358/61
[58] Field of Search ................... 358/60, 61, 231, 232, 358/237, 250; 353/30, 34, 37; 350/342, 378

[56] References Cited

U.S. PATENT DOCUMENTS

| 3,637,931 | 1/1972  | Donjon       | 358/232     |
| 3,878,328 | 4/1975  | Marie        | 358/232     |
| 4,018,509 | 4/1977  | Boswell et al. | 350/160 LC |
| 4,049,994 | 9/1977  | Garvin et al. |             |
| 4,113,367 | 9/1978  | Fritzler     |             |
| 4,126,386 | 11/1978 | Fritzler     |             |
| 4,127,322 | 11/1978 | Jocobson     | 358/61      |
| 4,389,096 | 6/1983  | Hori         | 358/231     |
| 4,611,245 | 9/1986  | Trias        | 358/231     |

OTHER PUBLICATIONS

U. Efron et al, "Silicon Liquid Crystal Light Valves: Status and Issues", Optical Engineering, vol. 22, No. 6, Nov./Dec. 1983, pp. 682–686.
A. Farrayre et al, "Geometrical Resolution Improvement of Sodern Visualization System", 1985 SID International Symposium, Digest of Technical Papers, 1st ed., May 1985, pp. 266–269.
W. Lee et al, "Flickerless Dynamic IR Scene Generation for Simulation Applications", SPIE, vol. 940, Apr. 4–6, 1988, pp. 176–181.
V. T. Bly, "Passive Visible to Infrared Transducer for Dynamic Infrared Image", Optical Engineering, vol. 21, No. 6, Nov./Dec. 1982, pp. 1079–1082.
S. T. Wu et al, "Infrared Liquid Crystal Light Valve", Proceedings of SPIE–The International Society of Optical Engineering, vol. 572, Aug. 20–21, 1985, pp. 94–101.
"Geometrical Resolution Improvement of Sodern Visualization System", SID 85 Digest, Laboratorire d'Electronique et de Physique Appliquee, Limeil-Brevannes, France, pp. 266–269, (Authors: A. Farrayre et al.).

Primary Examiner—Tommy P. Chin
Attorney, Agent, or Firm—V. D. Duraiswamy; P. M. Coble; W. K. Denson-Low

[57] ABSTRACT

A video projector system is used to produce a substantially flicker-free optical video image, which is then applied to a liquid crystal light valve (LCLV) to modulate and impose the video image upon a readout infrared (IR) or ultra-violet (UV) beam. The optical projector preferably employs a high impedance electro-optical crystal which receives a video pattern of electric charges from an electron beam operating in conjunction with a conductive grid adjacent the crystal, the grid receiving a video signal in synchronism with the scanning electron beam. The LCLV is preferably of the type which includes a liquid crystal layer integrated within a metal-oxide-semiconductor structure. The undesirable effects of any asymmetry between the WRITE and ERASE response times of the video projector are reduced by making the WRITE response faster than the ERASE response, and having the LCLV operational voltage threshold above the voltage level attained at the end of an ERASE period. An incomplete video projector ERASE thus results in a complete LCLV ERASE.

9 Claims, 5 Drawing Sheets

SYSTEM AND METHOD FOR PRODUCING A FLICKER-FREE VIDEO IMAGE

This invention was made with Government support under Contract Number F08635-86-C-0194 awarded by the Department of the Air Force. The Government has certain rights in this invention.

BACKGROUND OF THE INVENTION

1. Field of the Invention

This invention relates to signal processing, and more particularly to systems and methods for producing a flicker-free video target image.

2. Description of the Related Art

It would be highly desirable to be able to simulate a real-time infrared (IR) or ultraviolet (UV) image that is substantially free of flicker. This would provide an effective way to test IR detectors, also referred to as "seekers" and "focal plane arrays". At present, problems of excessive flicker impose a serious constraint on IR simulation systems. A basic problem with image flicker is that it creates a false target indication, since flicker corresponds to a change in the temperature of the IR image. Unlike the human eye which integrates light flicker over a period of about 30-50 msec., IR detectors integrate flicker over periods of only about 1-5 msec. Thus, there is a significant range over which flicker (in the visible spectrum) would not be detected by the human eye but would be picked up by an IR detector if it is within the IR spectrum or a UV detector if it is within the UV spectrum.

Excessive flicker has been avoided heretofore with the use of a Bly cell to project a static image that has been applied to the cell. Bly cells are described in Vincent T. Bly, "Passive Visible to Infrared Transducer for Dynamic Infrared Image Simulation", Optical Engineering, Nov./Dec 1982, Vol. 21, No. 6, pp. 1079-1082. However, the requirement that this type of system be operated with a static image is a significant limitation, since a more meaningful test of IR detectors calls for the detection of images that can change in real-time.

A prior attempt to produce an IR simulation system with a real-time image involved the formation of a video image by a cathode ray tube (CRT). The CRT video image was applied as an input to a liquid crystal light valve (LCLV), to which an IR readout beam was applied. The LCLV modulated the IR readout beam with the video image from the CRT to produce a corresponding IR video image.

This approach unfortunately was found to result in a substantial amount of flicker. The problem is that the illuminated pixels on the CRT screen decay in intensity over time prior to the next electron beam scan. This causes an undesirable intensity gradient to appear on a projected IR image from an IR-LCLV which is coupled to the CRT, and an IR detector will then detect a non-uniform image. Because the detector is generally looking for intensity gradients, or edges, by which its associated algorithms determine the presence of "targets", such intensity gradients are misleading. While this problem could theoretically be solved by synchronizing the IR detector scan with the CRT electron beam scan, such synchronization may not be desired in many applications. Thus, although an IR-LCLV has the capability of projecting high resolution, high dynamic range, real-time simulated IR images when compared to a Bly cell, this advantage is mitigated by the CRT pixel decay. Furthermore, electrically driven matrix emitter devices have flicker if driven with simple RC-type pixel addressing circuits, since the RC decay is similar in effect to the phosphor decay of the CRT.

Modifications of the basic CRT-LCLV system described above might be envisioned to reduce or eliminate flicker, but they introduce other problems. In one such modification, two storage CRTs are provided with shutters in front of each screen. Operation is alternated between the two CRTs by means of the shutters, so that they are alternately applied to the LCLV. By staggering the video data frames between the two CRTs, the phosphor decay seen by the LCLV could theoretically be reduced significantly. However, in such a system, it may be difficult to implement the very fast shutter coordination that would be necessary to substantially avoid flicker. Furthermore, storage CRTs are non-uniform, resulting in image differences and consequent flicker.

Another approach would be to use a single CRT, but to increase the frame rate of the Raster scan from the conventional rate of about 30 Hz to a much higher rate, perhaps about 1,000 Hz. The CRTs of the future may provide higher bandwidths than that presently attainable, thereby making this approach more attractive.

A possible approach which does not provide real-time addressable images is the use of a "flicker-free" film or slide projector like the SCANAGON TM device produced by Robert Woltz Associates, Inc. of Newport Beach, Calif. and disclosed in Pat. Nos. 4,113,367 and 4,126,386 or comparable image projector. While the potential may exist for this limited technique, it has not been demonstrated to provide jitter-free and flicker-free images. Furthermore, this method will not provide real-time electronically updatable imagery.

SUMMARY OF THE INVENTION

In view of the above problems, the purpose of the present invention is to provide a system and method for producing a substantially flicker-free IR or UV video image that can be controlled in real time.

The present invention is operable with an LCLV read-out beam having a wavelength in the IR, UV or visible region of the spectrum. However, there is a greater need for flicker-free images in IR and UV simulation systems, and therefore the present invention is particularly useful as applied to IR and UV LCLV readout beams.

To accomplish this purpose, an IR or UV beam is modulated to impose thereon a video image which is derived from an input video signal. A substantially flicker-free optical visible projection system is provided. In a presently preferred embodiment, this comprises an electrooptic dielectric crystal that is at least partially transparent to a predetermined light waveband, a conductive grid adjacent to but spaced from the crystal, a means for applying a video voltage signal across the grid and crystal, and an electron gun which scans the crystal surface with a constant intensity electron beam in synchronism with the video signal. The electron beam (in conjunction with secondary electron emission) produces a conducting path between the grid and the portion of the crystal under the beam, transferring a localized charge to the crystal and inducing therein a corresponding localized birefringence. Since the amount of charge transfer is controlled by the video signal on the grid at the time of transfer, the electron beam forms a video pattern of localized charges on the crystal surface, and a corresponding birefringence pattern in the crystal, as scanning proceeds in synchronism with the video signal.

An optical beam is polarized and transmitted through the crystal to acquire the crystal's spatial birefringence pattern as a pattern of polarization rotations, and the beam is reflected back through the crystal by a mirror. The polarization pattern of the reflected beam is analyzed by a cross-polarizer, which transmits an output optical beam having a video pattern determined by the controlling video signal. A high resolution is maintained by providing a crystal with an impedance sufficient to prevent substantial spreading of localized electric charges, limited mainly by the lateral electrostatic field between pixels of high contrast (e.g. high charge next to very little charge).

The optical video beam from the projector system is applied as a control input to an LCLV, which preferably includes a liquid crystal layer and a metal-oxide-semiconductor (MOS) structure. An IR or UV readout beam is polarized, passed through the LCLV, and then analyzed so that its intensity is spatially modulated in accordance with the video pattern carried by the input optical beam. The readout beam thus acquires a video image corresponding to the original video signal, which may be varied in real-time. With the described system, a substantially flicker-free image can be produced with a low power visible light source in the order of 100 watts for the projection system. Alternatively, other LCLV configurations such as GaAs-LCLV, amorphous Si-LCLV, or CdS-LCLV can be utilized.

The LCLV is coordinated with the operation of the projection system to convert what might otherwise be limitations of the projection system into an improved overall operation. Specifically, the WRITE and ERASE times of the presently preferred projection system are unequal, the identity of the faster operation depending upon the polarity of the grid voltage. The invention provides that the grid voltage polarity is selected to achieve a shorter WRITE period. The LCLV is selected so that, even with the longer ERASE period, the LCLV's operational threshold is crossed during an ERASE operation, thus producing a complete LCLV response even though the video projector response is less than complete.

Further features and advantages of the invention will be apparent to those skilled in the art from the following detailed description of a preferred embodiment, taken together with the accompanying drawings.

DETAILED DESCRIPTION OF A PREFERRED EMBODIMENT

Figure 1:
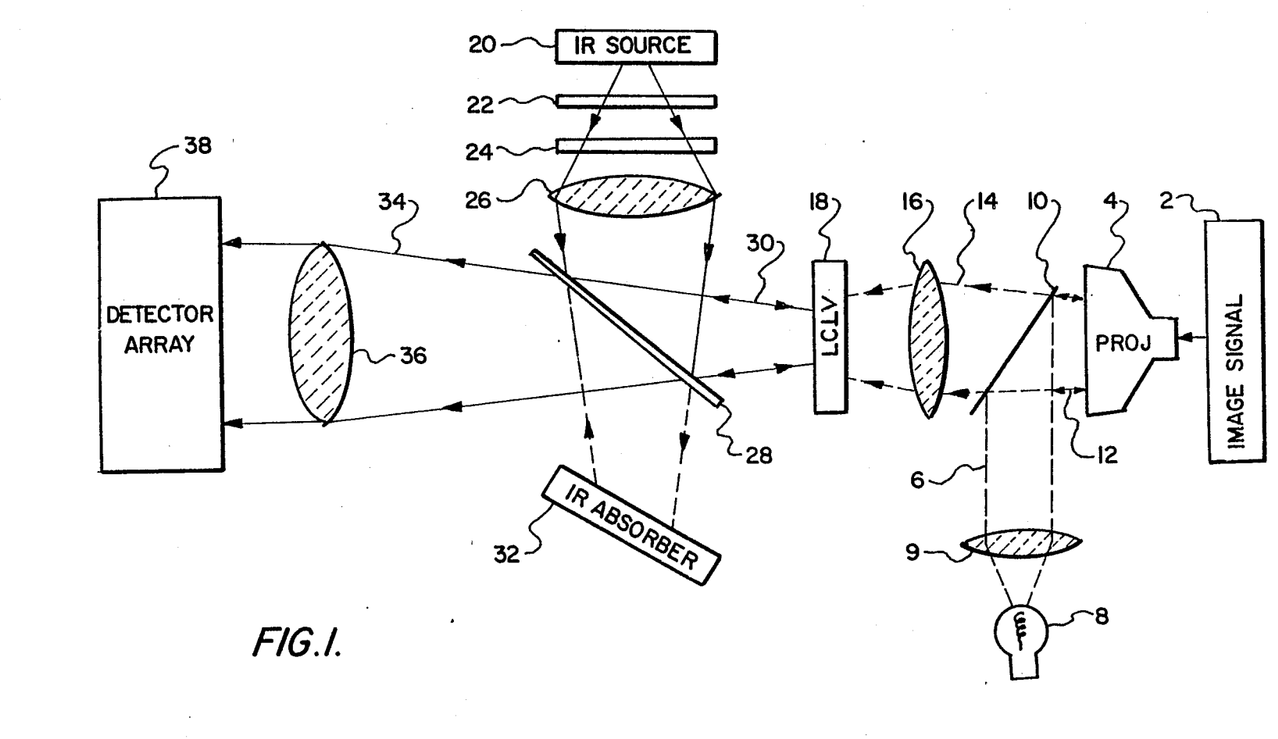
FIG. 1 is a block diagram of the present system for producing a substantially flicker-free IR or UV video image.

A preferred embodiment for the overall system of the present invention is shown in FIG. 1. A video image signal source 2 provides an electrical signal which controls a raster scan to produce a desired video image. Signal source 2 can be obtained from various video imaging mechanisms, such as a video tape or a computer image generation system. The video signal can be arranged in any desired format, such as standard NTSC RS170.

The video signal is applied to projector 4, which is a subsystem of the entire projection system and produces a substantially flicker-free output optical image. The term "optical38 is intended to mean non-IR and non-UV, and generally visible light. Projector 4 is preferably implemented with the Sodern Visualization System produced by the Sodern Company of Lineil Brevannes Cedex, France. Details of this particular video projector are provided hereinafter.

An optical beam 6 is formed from a low power intensity stabilized light source such as lamp 8, collimated by lens 9 and projected onto a polarizing beam splitter 10. This latter device provides the combined functions of splitting beam 6 and re-directing a portion of it onto projector 4 as an input readout beam 12, polarizing the readout beam 12, and cross-polarizing the output readout beam which is returned back from projector 4 along the path of the input beam 12. This cross-polarization function in effect analyzes the output readout beam from the projector, such that the spatial intensity of the output beam transmitted through polarizing beam splitter 10 varies in accordance with the degree of rotation of the output beam's polarization with respect to the initial polarization of input readout beam 12. Polarizing beam splitter 10 is provided as part of the Sodern Visualization System. It could be replaced by a separate beam splitter, input polarizer and output cross-polarizer, but it is preferable to use a device which combines these three functions in one. Commercially available calcite polarizes could also be used for the visible polarizer.

Projector 4 operates upon the input polarized beam 12 to reflect an output beam along the same path as beam 12, but with a spatial polarization pattern determined by the video image signal from signal source 2. Polarizing beam splitter 10 transmits only those portions of the output beam whose polarization has been rotated in accordance with the video signal. An output optical beam 14 which carries the desired video image is thereby transmitted by the polarizing beam splitter.

A lens 16, fiber optic bundle or a combination thereof directs the video image from projector 4 onto the input side of an LCLV 18. The lens will normally be used to magnify the video image so that it fills the available area on the LCLV, and should also be designed in accordance with standard optical principles to provide a uniform intensity and maintain the image resolution.

The LCLV 18 is designed to impose an optical input image onto a readout IR or UV beam. The preferred form for the LCLV is described in a presentation by S. T. Wu, U. Efron, J. Grinberg, L. D. Hess and M. S. Welkowsky, "Infrared Liquid Crystal Light Valve", *Proceedings of the International Society for Optical Engineering*, Vol. 572 (1985), pages 94–101; further details are provided below.

The present invention is operable with an LCLV readout beam with wavelength in the IR or UV region of the spectrum. However, the following description will refer only to IR readout beam for ease of explanation. This is not to be construed as a limitation.

The IR beam upon which the video image is to be imposed is derived from a suitable IR source 20, a spectral filter 22 which selects the desired IR waveband, and a pre-polarizer element 24. A lens 26 converges the IR radiation transmitted from the above elements onto an IR polarizing beam splitter 28, which splits and polarizes the IR beam. A portion of the split IR beam is directed onto LCLV 18 as a readout beam 30, while the remainder of the IR beam is absorbed by absorption element 32. LCLV 18 includes a liquid crystal layer which may be visualized as being divided into pixel elements, with the liquid crystals of each pixel rotated in accordance with the localized intensity of the applied optical video image. The readout beam 30 passes through the LC layer and is reflected back upon itself (for a double pass). Thus, the readout beam 30 acquires a pattern of polarization rotations dependent upon the LC rotations of all of the pixels. Upon passing through the polarizing beam splitter 28, the IR image beam 34 is formed having the video image information of the video image signal source 2. Polarizing beam splitter 28 could be replaced with a separate beam splitter and polarizing element, but a unitary device is preferred. A suitable device is described in U.S. Pat. No. 4,049,944, "Process for Fabricating Small Geometry Semiconductive Devices Including Integrated Components", by Garvin, Yariv and Somekh, issued Sept. 20, 1977 and assigned to Hughes Aircraft Company, the assignee of the present invention.

In the final step, the output IR beam 34 is directed by a collimating lens 36 onto a detector array or "seeker" 38. The optical image provided by a quality projector 4 is substantially flicker-free, and this characteristic is preserved by LCLV 18 to produce a substantially flicker-free output IR beam 34. Given well designed optics, the IR beam will also retain the high resolution of projector 4. Since the LCLV 18 requires only about 100 microwatts/cm$^2$ of writing intensity, the optical source 8 used to read the projector 4 can be a relatively low intensity lamp of approximately 100 watts power rating, with a high degree of intensity stability.

Figure 2:
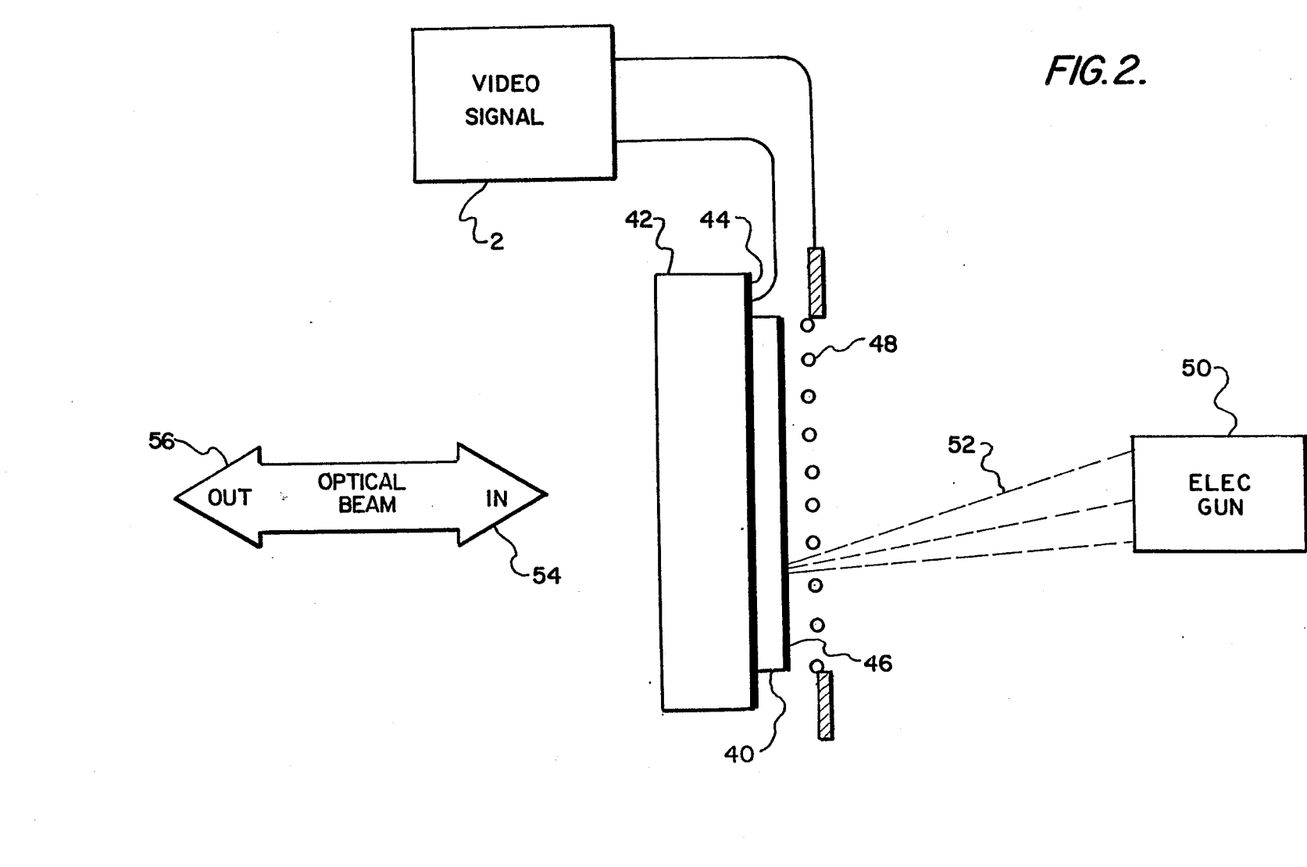
FIG. 2 is a simplified elevation view of the video projection system used to translate an electrical video signal to a visible image.

A simplified diagram of a preferred type of projector (of which the Sodern projection is an example) is shown in FIG. 2. The projector includes a high impedance solid electro-optic crystal 40 which is at least partially transparent to the wavelength of the light from lamp 8 as the basic beam-modulating element. The crystal impedance is high enough, generally in excess of $10^{12}$ ohm/sq., to prevent any substantial spreading of charge deposited upon its surface. In the Sodern device the crystal is formed from deuterated potassium di-phosphate (DKDP). Lithium niobate (LiNbO$_3$) or other electro-optic crystals could also be used, and LiNbO$_3$ may be advantageous since it can operate at room temperature rather than the very low temperature (about $-53°$ C.) required by DKDP. However, DKDP has the advantage of requiring a substantially lesser voltage than LiNbO$_3$ for a given level of birefringence. The birefringence of the DKDP crystal, which depends on the wavelength, however, is too low to produce IR images. The crystal is mounted on a substrate 42 which is generally transparent to the optical wavelength. A transparent electrode 44 is located at the interface between the crystal 40 and substrate 42, while a dielectric mirror 46 coats the opposite side of the crystal away from the substrate.

A fine conductive grid 48 is positioned spaced apart from the crystal, adjacent to the face with the dielectric mirror 46. The video image signal from video signal source 2 is applied across the grid 48 and electrode 44. An electron gun 50 directs a substantially constant intensity electron beam 52 across the mirrored crystal surface in a raster scan, with the beam penetrating the grid 48 just before reaching the crystal. At each point where the electron beam strikes the crystal, an electron cloud which is brought by the beam and created by secondary emission from the crystal works like a local short circuit between the grid and the adjacent crystal surface. A localized charge is thus transferred onto the crystal surface in an amount determined by the instantaneous grid video signal voltage. By coordinating the video signal applied to the grid with the scanning of the electron beam, a charge pattern is produced on the crystal surface which corresponds to the desired video image. This charge pattern is updated each time the beam completes a scanning pattern, and thus represents a real-time video image. The result is a shifting of the video image to a corresponding voltage pattern across the crystal. This process in general is *independent* of the previous grid voltage, permitting writing of charge onto the crystal and erasing to occur simultaneously. The high crystal impedance prevents any significant charge spreading or dissipation between successive scans, thereby causing the crystal spatial voltage pattern to be substantially constant and flicker-free.

The crystal surface which receives the charges may be considered to be composed of an array of pixels. The crystal birefringence behind each pixel varies in accordance with the voltage across the crystal at that pixel. Thus, the charge pattern applied to the crystal induces a corresponding pattern of localized birefringence. This in turn imposes the pixel pattern onto polarized light transmitted through the crystal, with the polarization rotated at each pixel by an amount which varies with the crystal's birefringence at that location. Accordingly, the video image pattern which is first represented on the grid by a varying voltage signal in coordination with the electron beam scanning is transferred in the form of a spatial polarization rotation pattern onto a polarized light beam transmitted through the crystal.

Figure 3:
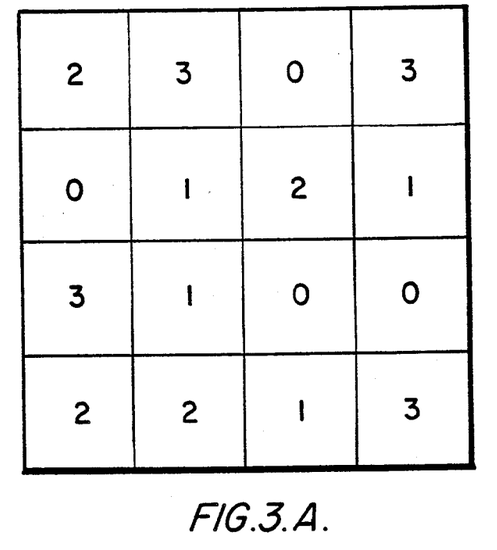
FIGS. 3(a) and 3(b) are illustrative examples of a possible birefringence pattern established in a dielectric crystal used in the video projector, and of the resulting spatial polarization rotation effect upon a polarized optical readout beam, respectively.

This effect is illustrated in FIGS. 3(a) and 3(b). FIG. 3(a) illustrates a matrix of pixels on the charged crystal surface, with the relative amount of charge at each pixel indicated by the numbers within the pixel squares. Numeral 3 represents maximum charge, while zero represents no applied charge. Assuming that a vertically polarized beam is transmitted through the crystal, the resulting polarization pattern of the output beam is indicated in FIG. 3(b). It can be seen that those pixels having zero charge do not effect the vertical polarization orientation, those pixels with maximum charge have their polarization rotated 90°, and the pixels with intermediate amounts of charge have their polarization rotated by corresponding amounts.

Referring back to FIG. 2, a polarized input beam 54 is directed through substrate 42, electrode 44 and crystal 40 onto the dielectric mirror 46; this beam corresponds to input readout beam 12 from the polarizing beam splitter 10 in FIG. 1. The polarization of the input beam 54 is rotated at each pixel location during transit through the crystal by an amount corresponding to the local crystal charge. The beam is reflected off mirror 46 and travels back through the crystal, receiving a further polarization rotation, to emerge as an output beam 56 having a spatial polarization rotation pattern which corresponds to the video image. This is the output beam which is transmitted through and processed by polarizing beam splitter 10 in FIG. 1, to emerge as optical video image beam 14. Although in FIG. 2 the input and output beams 54 and 56 are shown as being relatively small in diameter, in practice they would extend across substantially the entire crystal surface.

Figure 4:
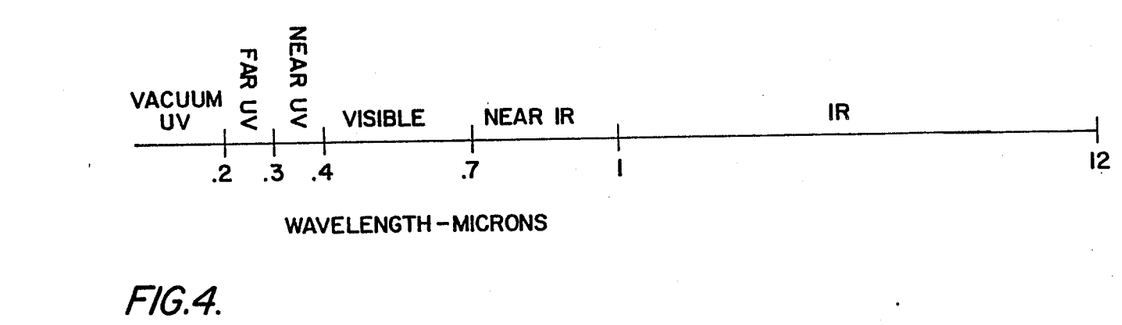
FIG. 4 is a wavelength chart showing the spectrum for which the invention is intended.

The portions of the electromagnetic spectrum on either side of the visible region, over which the invention is intended to operate, are shown in FIG. 4. The visible spectrum extends from a wavelength of about 0.4 to about 0.7 microns. The next longer wavelengths lie in the IR regime, while the next shorter wavelengths are in the UV regime. The invention is adaptable to both the IR and UV regimes.

Figure 5:
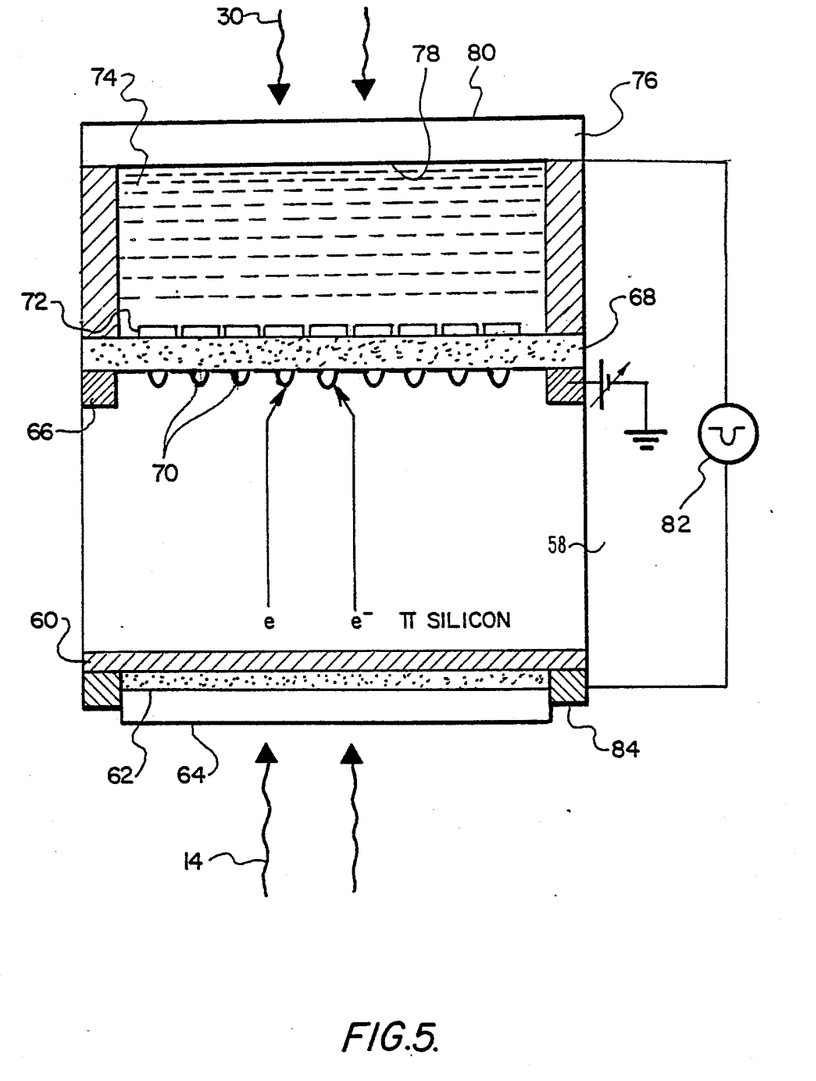
FIG. 5 is a sectional view of a LCLV used to impose the optical video image from the projection system onto a readout beam.

Referring now to FIG. 5, a sectional view of the preferred implementation of LCLV 18 for use with an IR output beam is given. The optical image beam 14 from projector 4 and lens 16 is applied to the input side of the device, while the IR readout beam 30 is applied to the readout side. A layer of high resistivity silicon photoconductor 58 has a thin p+ back contact layer 60 formed on its input side. This back contact provides a high sheet conductivity to present a very small load at any point in the device's cross-section where carriers are generated. The sensitivity and resolution of the device do not fluctuate with the input light level. An SiO$_2$ oxide layer 62 may optionally be provided on the input side of back contact 60, followed optionally by an optical cement 64. A DC-biased n-type diode guard ring 66 is implanted at the opposite edge of the silicon photoconductor wafer 58 from back contact 60 to prevent peripheral minority carrier injection into the active region of the device. An SiO$_2$ gate insulator layer 68 is formed on the readout side of the silicon photoconductor wafer 50. Isolated potential wells are created at the Si/SiO$_2$ interface by means of an n-type microdiode array 70. This prevents the lateral spread of signal electrons residing at the interface.

A reflective metal matrix mirror 72 is located on the readout side of the gate oxide layer 68 to provide broadband IR reflectivity. The matrix nature of the mirror provides for very high ($\approx 10^{12}$ ohms/sq.) surface resistivity. Because the incident IR radiation is below the band gap of the Si photoconductor, it does not create photocharge in the photoconductor. A thin film of fast response liquid crystal 74 is employed as the light modulating electro-optic layer on the readout side of mirror 72. A front IR transparent material 76, either Ge which is inherently conductive, or Si implanted at the liquid crystal side for a conductive electrode 78, is placed adjacent the liquid crystal. The front of plate 76 is coated with an anti-reflection coating 80, and the whole structure is assembled within an airtight anodized aluminum holder.

Silicon photoconductor 58 is coupled with oxide layer 68 and transparent "metallic" (conductive) electrode coating 78 to form an "MOS" structure. The combination of the insulating liquid crystal, oxide and mirror act as the insulating gate of the MOS structure.

In operation, an alternating voltage source 82 is connected on one side to back contact 60 by means of an aluminum back contact pad 84, and on its opposite side to counterelectrode 78. The voltage across the two electrodes causes the MOS structure to operate in alternate depletion (active) and accumulation (inactive) phases. In the depletion phase, the high resistivity silicon photoconductive layer 58 is depleted and electron-hole pairs generated by input optical image beam 14 are swept by the electric field in the photoconductor, thereby producing a signal current that activates the liquid crystal. The electric field existing in the depletion region acts to sweep the signal charges from the input side to the readout side, and thus preserves the spatial resolution of the input image. To avoid modulation of the effect of the liquid crystal, and "flicker" in the output, it is only necessary that the alternating voltage source 82 have a modulation frequency high enough that the liquid crystal only responds to an average voltage. This condition is easily satisfied. The polarized IR readout beam 30 enters the readout side of the light valve through transparent layer 76, passes through the liquid crystal layer 74, and is reflected by metal matrix mirror 72 back through the liquid crystal. Since the conductivity of each pixel in photoconductive layer 58 varies with the intensity of input optical beam 14 at that pixel, a voltage divider effect results which varies the voltage across the corresponding pixel of the liquid crystal in accordance with the spatial intensity of the input light. As is well known, the liquid crystals at any location will orient themselves in accordance with the impressed voltage, and the liquid crystal orientation relative to the readout beam polarization at any particular location will determine the amount of reflected readout radiation that will be transmitted by the analyzer. Thus, the spatial intensity pattern of the input light is transferred to a spatial liquid crystal orientation pattern in the liquid crystal layer, which in turn controls the spatial polarization of the IR readout beam which finally controls the spatial intensity of the IR beam transmitted by the analyzer.

LCLV 18 preserves the substantially flicker-free condition of input optical beam 14 as it is transferred onto the IR readout beam 30. Detector array 38 is thus presented with a desirable IR video image that is substantially flicker-free, and can be varied in real-time.

The use of a metal matrix mirror within the LCLV would not be suitable for a UV, as opposed to IR, readout beam. UV light is at a higher energy level than the Si bandgap and would create photoelectrons after passage through the gaps of the metal matrix mirror. Typical dielectric mirrors used for visible light LCLVs have low reflectivity in the UV. The desired characteristics for a UV mirror would be that its reflection be essentially 100%, its transmission be essentially zero (not more than $10^{-6}$), its sheet resistivity be very high (greater than about $10^{10}$ ohm/sq) to prevent image charge spreading, and its bulk resistivity be low so that little of the photo generated voltage is taken from the liquid crystal by the mirror. A mirror suitable for a UV LCLV is not yet known to have been implemented, but it is believed that such dielectric mirrors could be successfully fabricated with appropriate investigation of the component materials.

Figure 6:
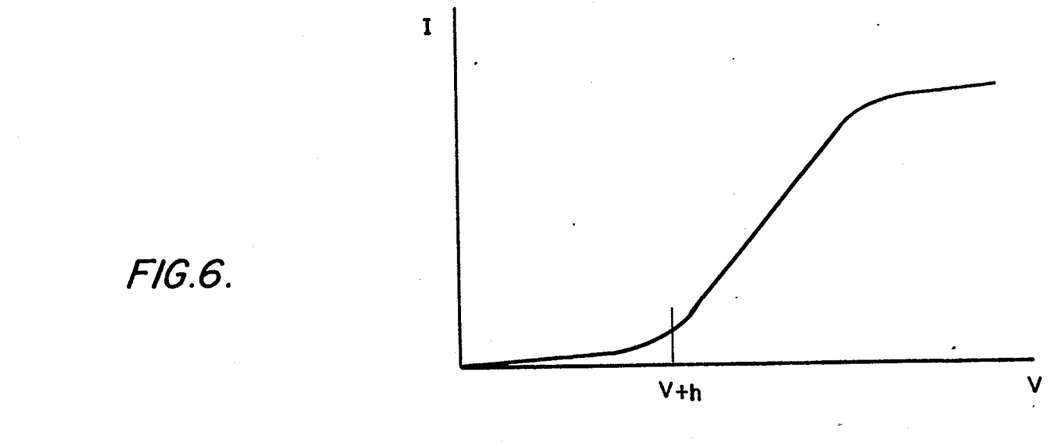
FIG. 6 is a graph illustrating a typical LCLV voltage response.

A typical current-voltage response curve for an LCLV is shown in FIG. 6. Appreciable modulation of the device's readout beam does not occur until the applied voltage across the liquid crystal exceeds a threshold level $V_{th}$. This phenomenon is utilized in accordance with the invention to further reduce flicker and improve the output image quality.

One of the limitations of the Sodern projector described above is that the period required for it to fully respond to an input video signal often exceeds the signal's frame period. This can result in an undesirable degree of flicker, and also in image smearing.

With a negative video voltage applied to the grid of the Sodern projector with respect to the grounded transparent electrode, the time required to WRITE charge onto or ERASE charge from a pixel on the crystal is discussed below. The ERASE operation, which occurs when a zero or low voltage frame follows a higher voltage frame and dissipates charge from the crystal, occurs fairly rapidly. The time required to fully WRITE charge onto a crystal pixel is considerably longer. With a typical video frame rate of 30 frames/sec., an ERASE operation may be nearly completed during a single frame, while a WRITE may be significantly incomplete.

When the polarity of the grid voltage is reversed and held positive, the ERASE and WRITE curves are also generally reversed. The WRITE operation is now completed fairly rapidly, while the ERASE operation takes considerably more time. In accordance with the invention, however, it is not necessary to ERASE all the way to zero to obtain a zero modulation of the LCLV output beam. Rather, it is necessary to erase only enough to lower the voltage across the liquid crystal in the light valve sufficiently to turn off that pixel of the light valve. Since the initial portion of the ERASE operation occurs rapidly, and does not tail off significantly until the pixel has been substantially erased, the LCLV is designed so that its voltage threshold is above the voltage level existing at the end of an ERASE frame. At this point even though charge is still left on the pixel of the projector crystal, the corresponding pixel of the light valve readout beam will not be modulated. Thus, the rapid WRITE of charge onto the crystal is used to produce a correspondingly high degree of responsiveness in the light valve, while the relatively slower ERASE operation in the projector does not materially effect the responsiveness of the light valve.

The Sodern projector employs a light source that is quite bright, a 4.5 kW xenon arc lamp. This type of source is generally unstable, and can produce flicker. When the Sodern projector is used in connection with an appropriate light valve as described above this bright light source can be replaced with a low intensity, highly stable source. A 100 Watt xenon arc lamp with a regulated power supply can be used to yield an intensity stability of about 0.2 %; a quartz halogen lamp could also be used for the source. With either of these low power sources, the optics should be adjusted to provide a substantially uniform illumination of the crystal.

While a preferred form of the invention has been shown and described, numerous variations and alternate embodiments will occur to those skilled in the art. For example, it might be possible to use a Bly cell rather than an LCLV to transduce the optical image beam to an IR image. However, serious trade-offs are encountered with a Bly cell in terms of speed, resolution and dynamic range. Accordingly, it is intended that the invention be limited only in terms of the appended claims.

I claim:

1. A system for modulating an infrared (IR) or ultraviolet (UV) beam to present a substantially flicker-free video target image, comprising:
   (a) a video projector, comprising:
   (1) an electro-optic crystal having first and second opposed surfaces and an impedance sufficient to prevent substantial spreading of localized electric charges on the crystal, said crystal being at least partially transparent to a predetermined light waveband,
   (2) a conductive grid adjacent to but spaced from said first crystal surface,
   (3) means for applying a video voltage signal across the conductive grid and said crystal,
   (4) an electron gun arranged to scan said first crystal surface with an electron beam in synchronism with said video voltage signal, the electron beam producing a conducting path between the conductive grid and the portion of the first crystal surface under the electron beam to transfer a localized charge to said crystal surface and induce in said crystal corresponding localized birefringence, the amount of said charge transfer being controlled by said video voltage signal on the conductive grid at the time of said transfer, the electron beam forming a video pattern of localized charges on said first crystal surface, and a corresponding pattern of localized birefringences in the crystal, as scanning proceeds in synchronism with said video voltage signal, and
   (5) a mirror arranged to reflect back through the crystal light which is transmitted through the crystal from said second crystal surface,
   (b) polarizing means for polarizing an input optical beam which includes at least part of said predetermined light waveband and is directed through the crystal from said second crystal surface, for analyzing the polarization pattern of a reflected beam reflected back through the crystal from said input optical beam, and for transmitting a video projector output beam which comprises a video pattern of said reflected beam, said video pattern corresponding to a polarization rotation pattern imposed upon the reflected beam by said pattern of localized birefringences, and
   (c) a liquid crystal light valve (LCLV) positioned to receive said video projector output beam as a control input to the LCLV, and to modulate an IR or UV readout beam applied to the LCLV in accordance with the video pattern carried by the video projector output beam, said LCLV converting the video projector output beam to a spatial voltage pattern and modulating the IR or UV readout beam in accordance with any portions of the spatial voltage pattern which exceed a threshold voltage, and the video projector having differing WRITE and ERASE periods, at least one of which is longer than the frame period of the video target image, the identity of the longer period depending upon the voltage polarity applied to the conductive grid, wherein said means for applying the video voltage signal across the conductive grid and said crystal applies a voltage polarity to the conductive grid which produces a shorter WRITE period, said LCLV having a response time such that its spatial voltage pattern is below its threshold voltage at the end of an ERASE period from the video projector, thereby inhibiting the LCLV from modulating said applied IR or UV readout beam at such time even if the video projector output beam and the LCLV spatial voltage pattern are greater than zero.

2. The beam modulating system of claim 1, further comprising optical means, positioned between said polarizing means and said LCLV for conveying said output beam onto the LCLV.

3. A system for producing an infrared (IR) or ultraviolet (UV) video image, comprising:
 a video projector system for producing a substantially flicker-free optical video image in response to an input video signal,
 a liquid crystal light valve (LCLV) having means for receiving an optical input image, and means for modulating an IR or UV readout beam applied to the LCLV with said optical input image,
 optical means for directing the optical video image from the video projector onto the LCLV as said optical input image thereto,
 an IR or UV source, and
 means for applying radiation from said IR or UV source to said LCLV as said IR or UV readout beam, said IR or UV readout beam acquiring said IR or UV video image from the LCLV,
 said LCLV converting the optical video image from the projector to a spatial voltgae pattern and modulating said IR or UV reacout beam in accordance with any portions of the spatial voltage pattern which exceed a threshold voltage, said LCLV having an ERASE response time such that its spatial voltage pattern is below its threshold voltage at the end of an ERASE period from the optical video image, whereby inhibiting the LCLV from modulating said IR or UV readout beam at such time even if the optical video image and the LCLV spatial voltage pattern are greater than zero.

4. The video image system of claim 3, wherein said light source is stabilized against intensity ripple.

5. The video image system of claim 3, said video projector system comprising:
 an electro-optical crystal having an impedance great enough to inhibit substantial spreading of charge deposited thereon,
 means for depositing charge pixels upon the crystal in a pattern corresponding to a desired video image, said charge pixels producing a localized birefringence pattern in the crystal,
 a light source
 means for forming light from said light source into a readout beam for the video projector,
 means for transmitting said projector readout beam through the crystal to acquire a polarization pattern corresponding to the crystal localized birefringence pattern, and
 means for polarizing said projector readout beam prior to transmission through the crystal, and for analyzing the projector readout beam after transmission through the crystal to product said IR or UV video image.

6. A method of forming an infrared (IR) or ultraviolet (UV) beam with a substantially flicker-free video image, comprising:
 applying charge pixels to an electro-optic crystal in a pattern corresponding to a desired video image, and thereby inducing a birefringence pattern in the crystal which also corresponds to the desired video image, the crystal having an impedance great enough to inhibit substantial spreading of charge deposited thereon,
 reading out the crystal birefringence pattern with a polarized crystal readout beam by transmitting said polarized crystal readout beam through the crystal and then processing it through a cross-polarizer,
 applying said polarized crystal readout beam after transmission through said crystal and processing through said cross-polarizer as a video input to a liquid crystal light valve (LCLV),
 applying a polarized IR or UV readout beam to the LCLV, and
 controlling the LCLV to transfer its video input onto said IR or UV LCLV readout beam,
 wherein the LCLV converts its video input a spatial voltage pattern and modulates said IR or UV LCLV readout beam in accordance with any portions of the spatial voltage pattern which exceed a threshold voltage, said LCLV having an ERASE response time such that its spatial voltage pattern is below its threshold voltage at the end of a ERASE period from said desired video image, thereby inhibiting the LCLV from modulating said IR or UV readout beam at such time even if said desired video image and the LCLV spatial voltage pattern are greater than zero.

7. The method of claim 6, wherein said charge pixels are applied to the crystal by positioning a conductive grid adjacent the crystal, applying a video voltage signal between the grid and said crystal, and scanning the crystal with an electron beam in synchronization with said video voltage signal.

8. The method of claim 7, wherein said video voltage signal is varied to vary the pattern of charge pixels on the crystal.

9. The method of claim 6, wherein the polarized light readout beam has a power rating on the order of about 100 watts.

* * * * *

UNITED STATES PATENT AND TRADEMARK OFFICE
CERTIFICATE OF CORRECTION

PATENT NO. : 4,894,724
DATED : JANUARY 16, 1990
INVENTOR(S) : MURRAY S. WELKOWSKY

It is certified that error appears in the above-identified patent and that said Letters Patent is hereby corrected as shown below:

Col. 11, line 23, delete "voltgae" and insert --voltage--.

Col. 11, line 24, delete "reacout" and insert --readout

Col. 11, line 31, delete "whereby" and insert --thereby--.

Col. 12, line 4, delete "product" and insert --produce--.

Signed and Sealed this

Nineteenth Day of October, 1993

Attest:

BRUCE LEHMAN

Attesting Officer

Commissioner of Patents and Trademarks